Jan. 5, 1965 P. A. HARDING 3,164,728
MAGNETIC SWITCHING CIRCUIT
Filed March 30, 1962

INVENTOR
P. A. HARDING
BY Lucian C. Canepa
ATTORNEY

United States Patent Office 3,164,728

Patented Jan. 5, 1965

3,164,728

MAGNETIC SWITCHING CIRCUIT

Philip A. Harding, Middletown, N.J., assignor to Bell Telephone Laboratories, Incorporated, New York, N.Y., a corporation of New York Filed Mar. 30, 1962, Ser. No. 183,941
5 Claims. (Cl. 307—88)

This invention relates to the processing of electrical signals, and more particularly to a magnetic switching circuit.

Magnetic elements having nearly rectangular hysteresis loops are becoming increasingly important as components of information processing systems to perform logic and memory functions therein. Such an element is characterized by two stable states of maximum remanent flux at zero external field and may be switched from one of these stable states to the other by the application thereto of a suitable drive or interrogation signal. The switching of the element between its stable states can be easily detected by means of an output or sensing winding inductively coupled to the element, whereby there is induced in the output winding a signal voltage proportional to the rate of flux reversal in the magnetic material of which the element is formed.

When such a magnetic element is interrogated in a sense opposite to that which would switch it, the element is said to be shuttled. Such shuttling takes place along a portion of the hysteresis curve that is not exactly horizontal. Consequently some flux change occurs in the material of the element during the shuttling process and, as a result, an undesirable shuttle or noise voltage is induced in the output winding even though the element is not being switched. The relationship between this shuttle voltage and the output voltage that is produced by the desired switching of the element may be expressed in terms of a signal-to-noise ratio. This ratio should advantageously be as large as possible so that the detected output voltage will be an unequivocal indication of whether the element was switched or simply shuttled.

An object of the present invention is the improvement of signal processing circuits.

More specifically, an object of this invention is the provision of an improved magnetic switching circuit having an advantageous signal-to-noise ratio.

These and other objects of the present invention are realized in a specific illustrative embodiment thereof which includes a magnetic element characterized by a substantially rectangular hysteresis curve that defines maximum positive and negative magnetic remanent states and an intermediate zero magnetization region. Illustratively, the element is placed in one of its magnetic remanent states by a set signal source and is then switched from the one state to the other remanent state by a main drive signal source that is inductively coupled to the element by means of an input winding. In this connection, it is significant to note that ordinarily, in prior known magnetic switching circuits, the time rate of change of the main drive current approximates zero during the time in which the switching element is in the immediate vicinity of its zero magnetization region.

An arrangement including an output winding responds to the switching of the element from one to the other of its magnetic remanent states by providing an output voltage signal. This arrangement includes a configuration that detects the occurrence of the peak portion of the output signal and in approximate time coincidence therewith supplies a trigger signal to an auxiliary drive source. In turn, the auxiliary source, which is also connected to the input winding, responds to the trigger signal by driving the magetic element with a narrow auxiliary signal whose time rate of change of current is relatively high. Since the peak portion of the output voltage signal occurs during the time in which the switching element is in the immediate vicinity of its zero magnetization region, the high time rate of change of current of the auxiliary signal also occurs at that particular time. Significantly, it is during that time that the permeability of the magnetic element attains its maximum value. Hence at that time the magnetic coupling between the input and output windings is greatest. Consequently transformer action can take place at that time between the input and output windings of the elements. As a result, the amplitude of the output voltage signal derived from the embodiment is increased by a factor proportional to the turns ratio of the input and output windings. In this novel manner the signal-to-noise ratio of the switching circuit is enhanced without a significant increase in the total drive energy applied to the magnetic element.

It is a feature of the present invention that a magnetic element be switched between its maximum remanent states by a main drive signal and that an auxiliary drive signal supply to the element a relatively high time rate of change of current during the portion of its switching cycle when it is in the immediate vicinity of its zero magnetization state.

It is another feature of this invention that a magnetic element be switched between its maximum remanent states by a main drive signal and that an auxiliary drive signal supply to the element a relatively high time rate of change of current during the peak portion of the output signal that is derived from the switching of the element.

A complete understanding of the present invention and of the above and other features and advantages thereof may be gained from a consideration of the following detailed description of an illustrative embodiment thereof presented hereinbelow in connection with the accompanying drawing, in which.

Figure 1:
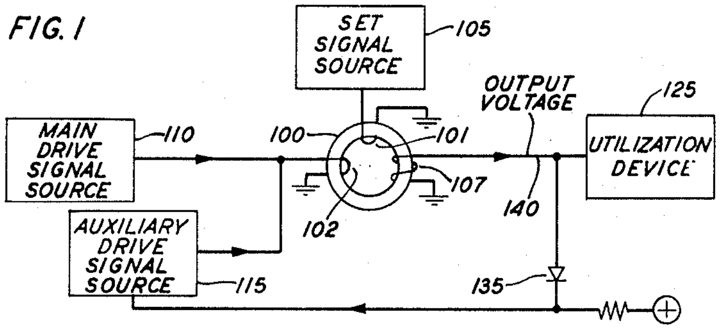
FIG. 1 shows a specific illustrative switching circuit made in accordance with the principles of the present invention.
Figure 2:
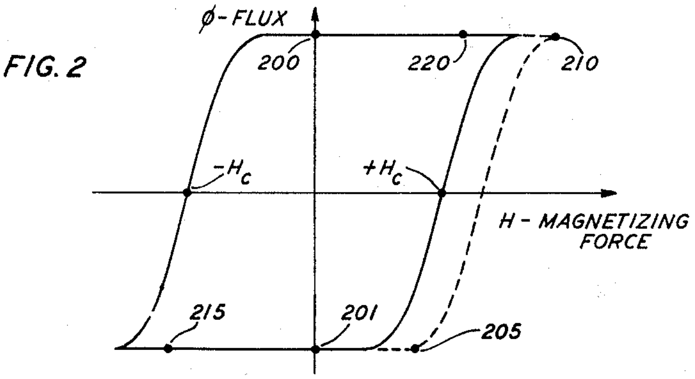
FIG. 2 depicts the hysteresis characteristic of the magnetic element included in the circuit shown in FIG. 1.

The circuit shown in FIG. 1 includes a magnetic element 100 which, illustratively, may be a toroidal core made, for example, either of a ceramic ferrite material or of ultrathin ferromagnetic alloy tape wound on a nonferromagnetic spool. The distinguishing characteristic of these cores is a nearly rectangular hysteresis loop. A loop of this type is shown in FIG. 2, wherein magnetic states 200 and 201 are respectively the positive and negative states of maximum remanent flux at zero external field or magnetizing force. Such a core can be switched from one of these states to the other by passage of a suitable pulse of current through a winding. In particular, the core 100 can be switched between its maximum remanent flux states by the application of a suitable signal to either set winding 101 or input winding 102.

Assume for illustrative purposes that the core 100 shown in FIG. 1 has been siwtched to the maximum negative remanent state 201 by a suitable signal from set source 105. The subsequent application to the input winding 102 of a positive main drive current signal whose amplitude corresponds at least to the magnetizing force $H_c$ (FIG. 2) and whose time duration is sufficient to permit the core 100 to completely switch between its maximum negative and positive remanent states, causes the core 100 to follow a dynamic switching path approximated by the dashed line depicted in FIG. 2. (It is noted that a negative drive current would simply cause the magnetic operating point of the core 100 to shuttle from the negative remanent point 201 to a point 215 whose corresponding flux value is slightly less than that corresponding to the point 201. Or, if the core 100 had initially been set by the source 105 to the positive remanent point 200, the subsequent application to the core of a positive main drive current signal would simply cause the operating point of the core material to shuttle from the point 200 to a point 220 whose corresponding flux value is slightly greater than that corresponding to the point 200.)

Figure 3:
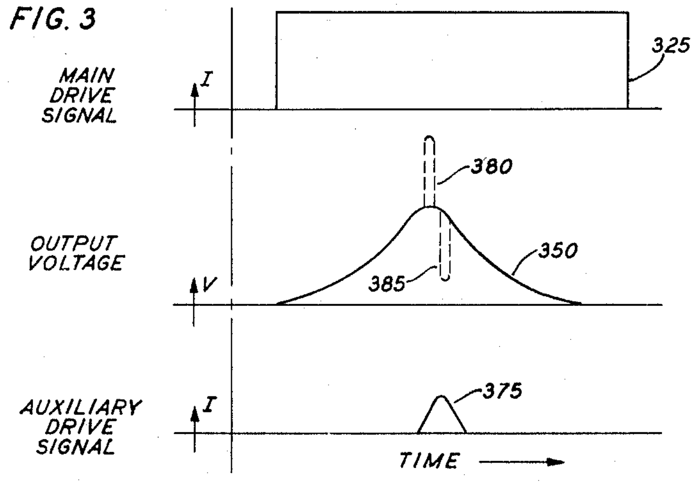
FIG. 3 illustrates various waveforms which are helpful in understanding the mode of operation of the circuit of FIG. 1.

The waveform 325 of an idealized main drive current signal that is capable of switching the core 100 is represented in the top row of FIG. 3. In response to such a main drive signal supplied from source 110 (FIG. 1), there is induced in output winding 107 and output voltage signal whose waveform 350 is represented by the solid line in the second row of FIG. 3. The peak point of this voltage signal occurs at the time at which the dynamic switching path of the core 100 intersects the H axis of FIG. 2, for it is at that time that the time rate of change of flux $$\left[\frac{d\varphi}{dt}\right]$$

due to the switching of the core 100 is highest. Since the amplitude of the output voltage is directly proportional to $$\frac{d\varphi}{dt}$$

the time of occurrence of the the maximum $$\frac{d\varphi}{dt}$$

defines the time of coccurrence of the peak point of the voltage induced in the output winding 107.

In switching between its maximum negative and positive remanent states, the core 100 shown in FIG. 1 undergoes a dynamic cycle of operation in which the flux therein passes through zero. As noted above, this zero magnetization condition occurs at the point at which the dynamic switching path shown in FIG. 2 intersects the H axis. During the time in which the magnetization condition of the core 100 is zero or essentially zero, a relatively high degree of flux coupling can take place between the input and output windings 102 and 107. Hence, during that time transformer action can occur in the FIG. 1 arrangement. Herein it is to be understood that the term "in the immediate vicinity of the zero magnetization region" refers to the flux range centered on the H axis of FIG. 2 that is traversed by the core 100 in ten to twenty percent of the total time required for it to move from point 205 (FIG. 2) to the point 210.

In a conventional magnetic switching circuit, the time rate of change of the drive current waveform is typically approximately zero during the time in which the core thereof is in the immediate vicinity of its zero magnetization state. Therefore, the output voltage waveform of such a conventional circuit does not include a voltage component attributable to transformer action between the input and output windings.

In accordance with the principles of the present invention, an auxiliary drive signal 375 (FIG. 3) is applied to the core 100 from source 115 (FIG. 1). This auxiliary signal is characterized by a relatively high time rate of change of current during the time in which the core 100 is in the immediate vicinity of its zero magnetization region. Advantageously, the auxiliary signal is insufficient by itself to effect switching of the core 100, the amplitude of the auxiliary signal being, for example, only about one-fifth that of the main drive signal 325. Also, the duration of the auxiliary drive signal is advantageously made relatively small compared with that of the main drive signal, whereby the additional driving energy supplied by the auxiliary drive signal source 115 to the winding 102 is therefore relatively small.

The leading edge of the auxiliary drive signal 375 shown in FIG. 3 exhibits a relatively large time rate of change of current. As a result thereof and of the relatively good coupling that exists between the input and output windings 102 and 107, a relatively large $$\frac{d\varphi}{dt}$$

occurs in the region of the output winding 107. Consequently, a relatively large voltage spike 380 proportional to the turns ratio of the windings 102 and 107 appears superimposed on the output signal 350, thereby significantly increasing the maximum amplitude of the signal delivered to utilization device 125. In this novel manner, the signal-to-noise ratio of a magnetic switching circuit is enhanced without significantly increasing the driving energy delivered to the input winding thereof. It is noted that during the trailing edge of the auxiliary signal 375, a superimposed negative spike 385, which in effect subtracts from the output voltage signal 350, is induced in the output winding 107.

As emphasized above, it is important that the relatively high time rate of change of current exhibited by the leading edge of the auxiliary signal 375 occur during the time in which the core 100 is in the immediate vicinity of its zero magnetization region. This can be easily assured by taking advantage of the fact that the peak point of the output voltage waveform 350 occurs in approximate coincidence with the time in which the core 100 is in its zero magnetization condition. Thus, for example, a positively-biased diode 135 (FIG. 1) can be adjusted to remain nonconducting until the output voltage waveform 350 applied to the anode thereof reaches a predetermined positive amplitude approximating the peak point of the waveform 350, whereby a trigger or enabling signal is only then applied via the diode 135 to the auxiliary source 115 to cause it to apply the current waveform 375 to the input winding 102.

Alternatively, suitable circuitry can be connected to output lead 140 to detect the time at which the time rate of change of the output voltage signal 350 is zero. Such circuitry could then supply a trigger signal to the auxiliary drive source 115. Or a master timing source can be arranged to trigger the main source 110 and the auxiliary source 115 in a predetermined time-spaced relationship dependent on the geometry and material of the particular magnetic element being switched.

Although the FIG. 1 circuit includes two distinct drive sources 110 and 115, it is to be understood that a single source supplying the composite waveform that results from the superposition of the signals 325 and 375 would, of course, also be effective to realize the enhanced switching operation described herein.

Additionally, it is to be understood that although emphasis hereinabove has been directed to a magnetic core switching element, other suitable magnetic elements, such as, for example, discrete areas on a magnetic sheet, tape, film or drum, are clearly also within the purview of the principles of this invention.

Finally, it is to be understood that the above-described arrangements are only illustrative of the application of the principles of the present invention. Numerous other arrangements may be devised by those skilled in the art without departing from the spirit and scope of the invention. For example, the circuit shown in FIG. 1 may be used as a logic gate, in which case the utilization device 125 may be a threshold device that responds only to signals which exceed the peak amplitude of the output signal 350, whereby the threshold of the device is exceeded only if both the main drive signal 325 and the auxiliary drive signal 375 are applied in proper time-spaced relationship to the input winding 102.

What is claimed is:

1. In combination in a switching circuit, a magnetic element characterized by a substantially rectangular hysteresis curve which exhibits maximum positive and negative magnetic remanent states and an intermediate zero magnetization region, means for setting said element to one of said magnetic remanent states, means for switching said element from said one state to the other remanent state, and means responsive to the element being switched between its remanent states for providing an output voltage signal, said switching means including an input winding inductively coupled to said element and a first source for supplying to said winding signals each of which is sufficient to switch said element between its remanent states, said switching means further including a second source for supplying to said input winding during the time in which the element is in the immediate vicinity of its zero magnetization region a signal which exhibits a relatively large time rate of change of current during said time and which signal is insufficient by itself to switch said element.

2. In combination in a switching circuit, a magnetic element characterized by a substantially rectangular hysteresis loop, said loop including positive and negative maximum remanent regions and a zero magnetization region, means for setting said element to one of said maximum remanent regions, and means for switching said element from said one region through said zero magnetization region to the other maximum remanent region, said switching means including means for applying to said element a relatively high time rate of change of current during the time in which the element is in the immediate vicinity of its zero magnetization region.

3. A combination as in claim 2 further including means responsive to the element being switched between its maximum remanent regions for providing an output signal.

4. A combination as in claim 3 wherein said responsive means includes means for detecting the occurrence of the peak portion of said output signal and for triggering said applying means in approximate time coincidence with said occurrence.

5. In combination in a switching circuit, a magnetic element characterized by a substantially rectangular hysteresis curve which defines maximum positive and negative magnetic remanent states and an intermediate zero magnetization region, means for switching said element between its maximum remanent state by applying thereto a main drive signal of a predetermined polarity, and means for applying to said element during the time in which said element is in the immediate vicinity of its zero magnetization region a subsidiary drive signal characterized by a relatively high time rate of change of current of the same polarity as that of said main drive signal.

References Cited in the file of this patent

UNITED STATES PATENTS 3,027,547 Froehlich -------------- Mar. 27, 1962